US012722612B2

(12) United States Patent
Lim

(10) Patent No.: US 12,722,612 B2
(45) Date of Patent: Sep. 1, 2026

(54) HYDRAULIC BRAKE FOR VEHICLE AND CONTROL METHOD THEREFOR

(71) Applicant: HYUNDAI MOBIS Co., Ltd., Seoul (KR)

(72) Inventor: Jae Il Lim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 985 days.

(21) Appl. No.: 17/894,286

(22) Filed: Aug. 24, 2022

(65) Prior Publication Data

US 2023/0146934 A1 May 11, 2023

(30) Foreign Application Priority Data

Nov. 8, 2021 (KR) ........................ 10-2021-0152599

(51) Int. Cl.
*B60T 13/74* (2006.01)
*B60T 8/94* (2006.01)
(Continued)

(52) U.S. Cl.
CPC .............. *B60T 8/94* (2013.01); *B60T 13/147* (2013.01); *B60T 13/686* (2013.01); (Continued)

(58) Field of Classification Search
CPC ................. B60T 13/686; B60T 13/745; B60T 2270/402; B60T 2270/404; B60T 2270/413
See application file for complete search history.

(56) References Cited

U.S. PATENT DOCUMENTS

2006/0043790 A1 3/2006 Spieker
2017/0072920 A1* 3/2017 Besier .................. B60T 8/4081
(Continued)

FOREIGN PATENT DOCUMENTS

CN 101037090 A 9/2007
CN 111231918 A 6/2020
(Continued)

OTHER PUBLICATIONS

European Office Action issued on Dec. 18, 2024 in Japanese European Application No. 22192599.3.
(Continued)

*Primary Examiner* — Bradley T King
(74) *Attorney, Agent, or Firm* — Morgan, Lewis & Bockius LLP

(57) ABSTRACT

A control method of a hydraulic brake apparatus for a vehicle including a first brake device and a second brake device configured to supply hydraulic pressure to wheel brakes, and a control unit including a first controller controlling the first brake device and a second controller controlling the second brake device, includes receiving information for determining a status of the first brake device by means of the control unit; determining whether the first brake device is normally operated using the information for determining a status of the first brake by means of the control unit; and controlling at least one of the first brake device and the second brake device to decrease a hydraulic pressure loss amount in the wheel brakes when the control unit determines that the first brake is not normally operated.

19 Claims, 8 Drawing Sheets

(51) Int. Cl.
*B60T 13/14* (2006.01)
*B60T 13/68* (2006.01)

(52) U.S. Cl.
CPC ... *B60T 2270/402* (2013.01); *B60T 2270/413* (2013.01); *B60T 2270/88* (2013.01)

(56) References Cited

U.S. PATENT DOCUMENTS

| | | | | |
|---|---|---|---|---|
| 2019/0210581 | A1 | 7/2019 | Saito | |
| 2020/0172067 | A1 | 6/2020 | Einig et al. | |
| 2021/0146900 | A1 | 5/2021 | Einig et al. | |
| 2021/0179051 | A1 | 6/2021 | Alford et al. | |
| 2022/0169222 | A1* | 6/2022 | Ullrich | B60Q 9/00 |
| 2022/0194339 | A1* | 6/2022 | Tarandek | B60T 13/745 |
| 2024/0278757 | A1* | 8/2024 | Ganzel | B60T 17/221 |

FOREIGN PATENT DOCUMENTS

| | | | |
|---|---|---|---|
| CN | 111954614 | A | 11/2020 |
| CN | 111976682 | A | 11/2020 |

OTHER PUBLICATIONS

Extended European Search Report dated Mar. 21, 2023, issued in corresponding European Patent Application No. 22192599.3.

Office Action issued on Oct. 1, 2025 in European Patent Application No. 22192599.3.

Office Action issued on Dec. 15, 2025 in Chinese Patent Application No. 202211187484.6 with English translation.

* cited by examiner

HYDRAULIC BRAKE FOR VEHICLE AND CONTROL METHOD THEREFOR

CROSS-REFERENCE TO RELATED APPLICATION

The present application claims priority to Korean Patent Application No. 10-2021-0152599, filed on Nov. 8, 2021, the entire contents of which is incorporated herein for all purposes by this reference.

TECHNICAL FIELD

The present disclosure relates to a hydraulic brake for a vehicle and a control method therefor.

BACKGROUND

Description of this section only provides the background information of the present disclosure without configuring the related art.

An assistant brake device configured to generate breaking pressure in order to assist a main brake device in a vehicle when the main brake device fails. An assistant controller that controls the assistant brake device to assist the main controller that controls the main brake device may be mounted with the assistant brake device. An assistant brake system is configured to start cooperative control when the output of the main brake device does not satisfy preset conditions. The case in which the output of the main brake device does not satisfy preset conditions may be understood as a case in which the main brake device fails.

Meanwhile, the main brake device may not be normally operated although the main brake device does not satisfy preset conditions. Further, it may take time for the hydraulic pressure of a wheel brake reaches target hydraulic pressure due to communication time between the main controller and the assistant controller and channel resistance at the time point at which cooperated control is started because the main brake device does not satisfy preset conditions. There is a problem in that, in these situations, even though a brake system of a vehicle is equipped with the assistant brake device, the assistant controller, and a cooperative control means between the assistant brake device and the assistant controller, a braking force required to safely drive the vehicle cannot be generated.

SUMMARY

According to at least one aspect, the present disclosure provides a control method of a hydraulic brake apparatus for a vehicle including a first brake device and a second brake device configured to supply hydraulic pressure to wheel brakes, and a control unit including a first controller controlling the first brake device and a second controller controlling the second brake device, the control method comprising: receiving information for determining a status of the first brake device by means of the control unit; determining whether the first brake device is normally operated using the information for determining a status of the first brake by means of the control unit; and a controlling at least one of the first brake device and the second brake device to decrease a hydraulic pressure loss amount in the wheel brakes when the control unit determines that the first brake is not normally operated.

According to another aspect, the present disclosure provides a hydraulic brake apparatus for a vehicle comprising a first control unit configured for controlling a first brake device configured to supply first hydraulic pressure to a plurality of wheel brakes, and a second control unit configured for controlling a second brake device connected in series between at least some of the plurality of wheel brakes and the first brake device, wherein the first control unit includes: a first receiver receiving a status signal of components of the first brake device from a signal generator of the first brake device; a first determining unit determining whether the first brake device is normally operated; and a first controller controlling the first brake device to block flow of fluid to a fluid reservoir from the wheel brakes when the first brake device is not normally operated, and the second control unit includes: a second receiver receiving required braking force information from a required braking force calculator of the vehicle and receiving information about pressure from a middle flow path pressure sensor mounted in a channel at the first brake device; a second determining unit determining whether the first brake device is normally operated; and a second controller controlling the second brake device to block flow of fluid from the fluid reservoir from the wheel brakes when the first brake device is not normally operated.

DETAILED DESCRIPTION

Figure 1:
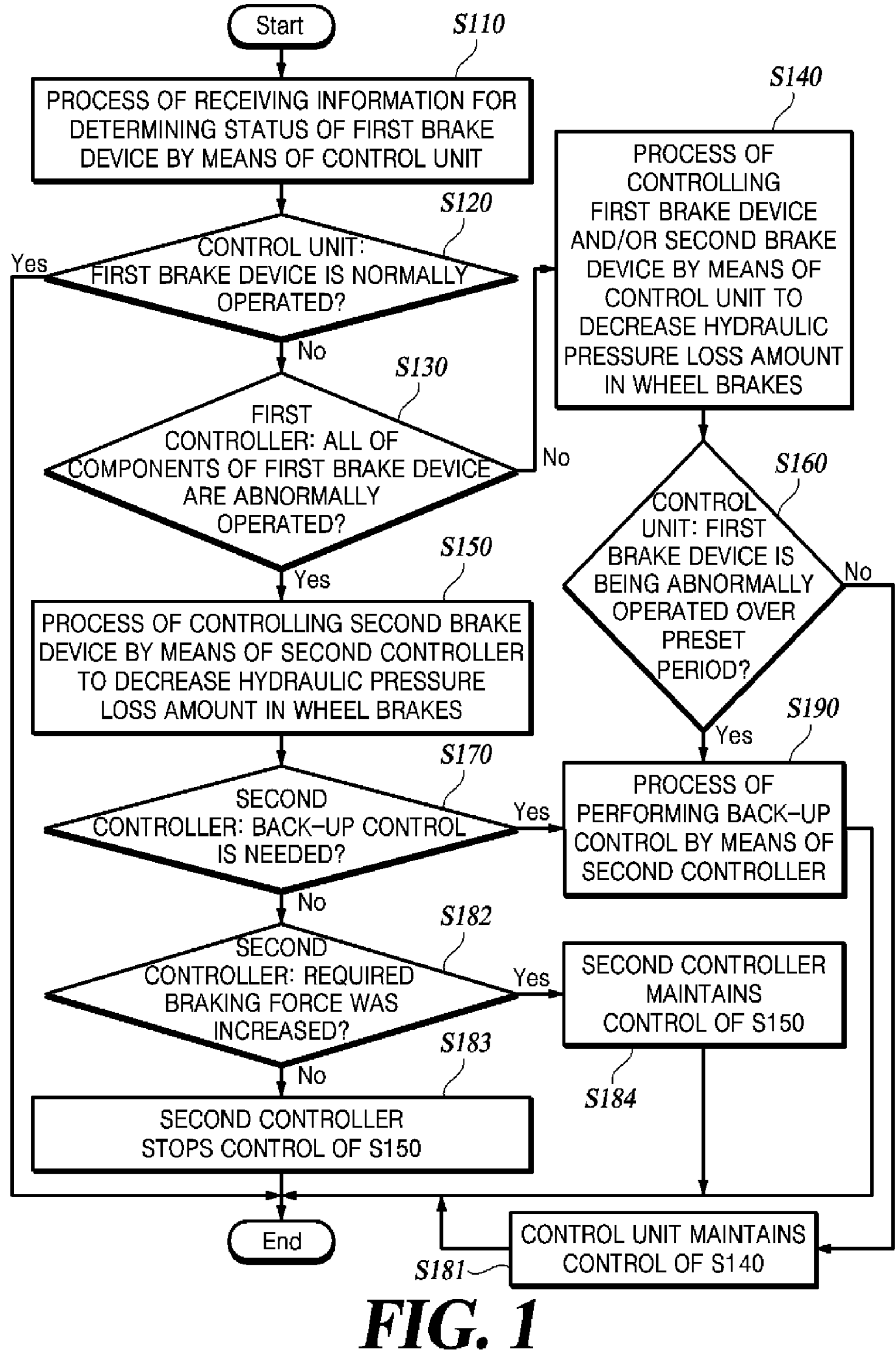
FIG. 1 is a flowchart showing a control method according to an embodiment of the present disclosure.

A hydraulic brake for a vehicle and a control method therefor can stably generate a braking force required for the vehicle by controlling a main brake device or an assistant brake device to prevent a loss of hydraulic pressure of a wheel brake during a transition phase in which a normal control steps enters a cooperative brake step.

The objects of the present disclosure are not limited to the objects described above and other objects will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

When components are connected, it means that the components communicate with each other such that fluid can flow.

FIG. 1 is a flowchart showing a control method according to an embodiment of the present disclosure.

Referring to FIG. 1, in a control method 100 for a hydraulic brake for a vehicle according to an embodiment of the present disclosure, a control unit 290 receives information for determining the status of a first brake device 210 (S110). The control unit 290 determines whether the first brake device 210 is normally operated using the received information (S120). When the first brake device 210 is not normally operated, the control unit 290 controls the first brake device 210 and/or the second brake device 220 to decrease a hydraulic pressure loss amount in wheel brakes w1 to w4. Control is ended when the first brake device 210 is normally operated.

In detail, when the first brake device 210 is not normally operated, the control unit 290 determines whether all components in the first brake device 210 are abnormally operated through first controllers 291 in the wheel brakes w1 to w4. In the present disclosure, a non-normal operation case is referred to an 'abnormal operation case'. Although it is shown in FIG. 1 that a process S130 is performed after a process S120, the present disclosure is not limited thereto. Determination processes of the process S120 and the process S130 may be simultaneously or collectively performed. For example, when the first controller 291 determines that only some components of the first brake device 210 fail by receiving a status signal showing that only some components fail from a signal generator 215, the process S120 and the process S130 are collectively performed. Unlikely, the first controller 291 may control the first brake device 210 or the second controller 292 may control the second brake device 220 to suppress a loss of hydraulic pressure of the wheel brakes w1 to w4 not via the process S130 after the process S120.

When only some components of the first controller 291 are abnormally operated, the control unit 20 controls the first brake device 210 and/or the second brake device 220 to decrease a hydraulic pressure loss amount in the wheel brakes w1 to w4 (S140). The control unit 290 determines whether the first brake device 210 is being abnormally operated over a preset period after the process S140 (S160). When it is determined that the preset period is not exceeded in a process S160, the control unit 290 keeps performing the control of the process S140 (S181).

Unlikely, when all of the components of the first controller 292 are abnormally operated, the control unit 20 controls the second brake device 220 to decrease a hydraulic pressure loss amount in the wheel brakes w1 to w4 (S150). After the step S150, whether the second controller 292 needs back-up control is determined (S170). When it is determined that back-up control is not needed, the second controller 292 determines whether required braking power was increased after the time point at which the process S130 is performed (S182). When it is determined that the required braking power was not increased, the second controller 292 stops the control of S150 (S183). When it is determined that the required braking power was increased, the second controller 292 keeps performing the control of the process S150. When the second controller 292 determines that a lapse time of abnormal operation of the first brake device 210 exceeded a preset period in a process S160 or that back-up control is needed in a process S170, the second controller performs back-up control (S190). The back-up control may be understood as a process in which the second controller 292 controls the second brake device 220 such that the second brake device 220 forms a braking force by assisting the first brake device 210 when the output of the first brake device 210 reaches a status in which the first brake device 210 cannot satisfy preset conditions. Further, the first brake device 210 undergoes a 'non-operating status' of the present disclosure, that is, a transition phase before reaching the status in which the first brake device 210 cannot satisfy preset conditions.

According to the control method 100 according to an embodiment of the present disclosure, the control unit 290 determines whether it is a transition phase, and correspondingly controls the first and second brake devices 210 and 220. Accordingly, there is an effect that the hydraulic brake for a vehicle can stably generate required braking force.

Figure 2:
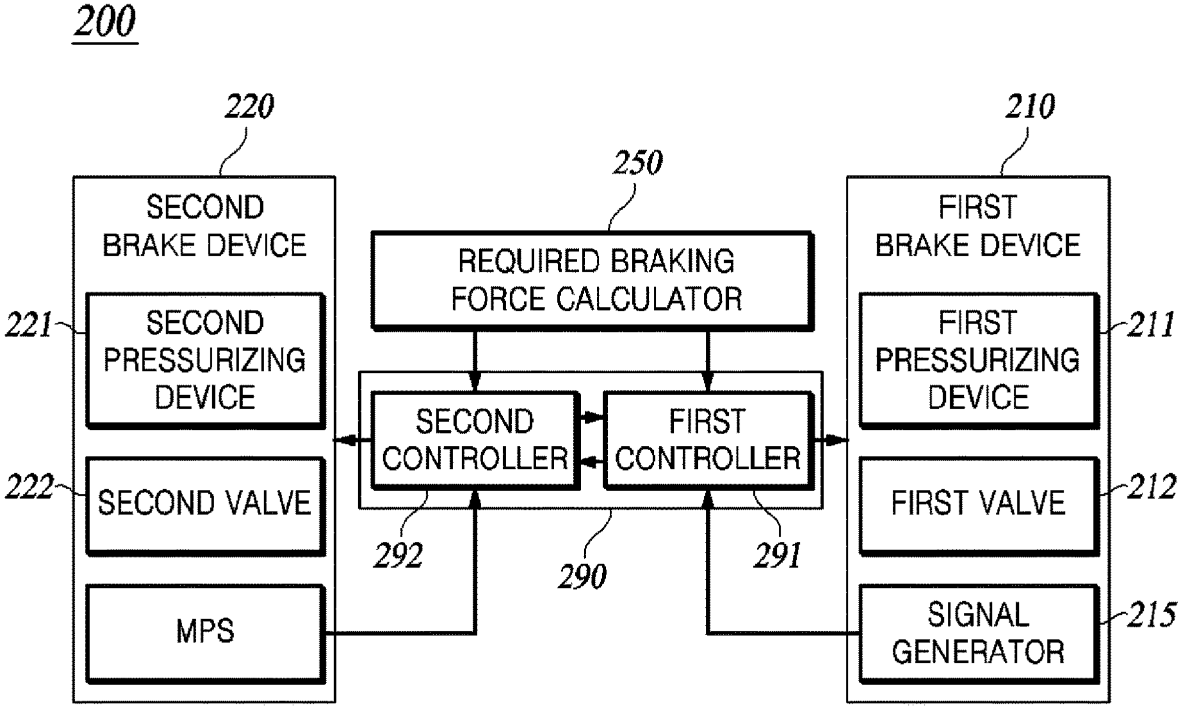
FIG. 2 is a block diagram schematically showing the configuration of a hydraulic brake for a vehicle of the control method according to an embodiment of the present disclosure.

FIG. 2 is a block diagram showing the configuration of a hydraulic brake for a vehicle of the control method according to an embodiment of the present disclosure.

Figure 3:
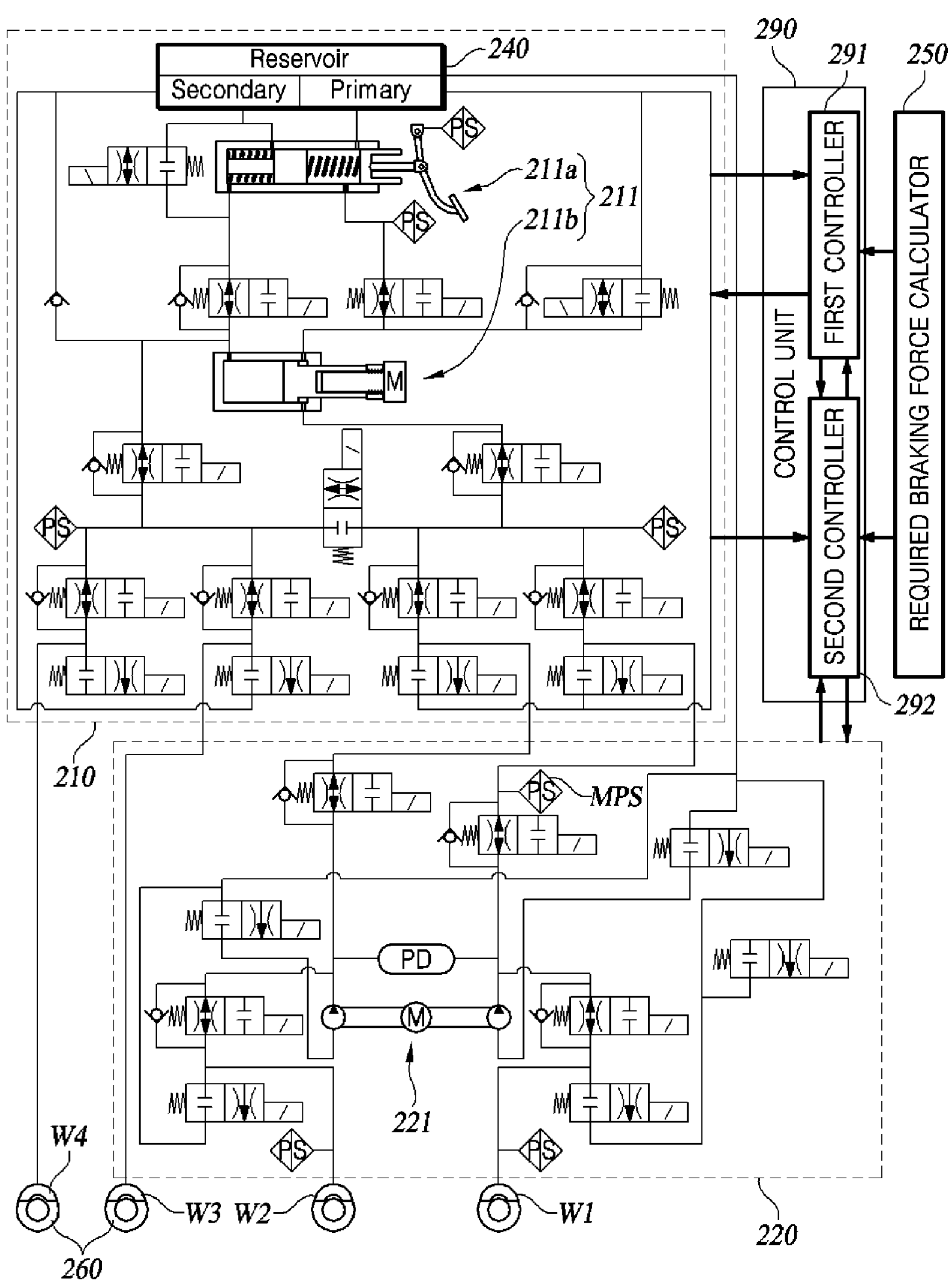
FIG. 3 is a hydraulic circuit diagram showing a hydraulic brake for a vehicle of a control method according to an embodiment of the present disclosure.

FIG. 3 is a hydraulic circuit diagram showing a hydraulic brake for a vehicle of a control method according to an embodiment of the present disclosure.

The configuration of a hydraulic brake for a vehicle of the control method 100 according to an embodiment of the present disclosure is briefly described. The hydraulic brake for a vehicle includes all or some of wheel brakes w1 to w4, a fluid reservoir 240, a first brake device 210, a second brake device 220, a required braking force calculator 250, an electronic parking brake 260, and a control unit 290.

The wheel brakes w1 to w4 are configured to brake a vehicle using hydraulic pressure. The hydraulic brake for a vehicle may include a plurality of wheel brakes w1 to w4. The fluid reservoir 240 is configured to receive fluid from the wheel brakes w1 to w4 when fluid that is supplied to a first and/or a second pressurizing device 211 and/or 222 is stored or the hydraulic pressure of the wheel brakes w1 to w4 is decreased. Referring to FIG. 3, the fluid reservoir 240 is directly connected between the master cylinder 111*a* of the first brake device 210 and the wheel brakes w1 to w4.

The first brake device 210 is configured to supply first hydraulic pressure to the wheel brakes w1 to w4. The first brake device 210 may include a first pressurizing device 211 that pressurizes fluid, a signal generator 215, and a plurality of first valves 212 configured to adjust a flow path of fluid. The first pressurizing device 211 may include all or some of a master cylinder 111*a* and a motor piston 111*b*. The first brake device 210 may include a signal generator 215 that generates a status signal showing whether components of the first brake device 210 fail. The signal generator 215 includes sensors that sense hydraulic pressure, temperature, current, or the like in the channel of the first brake device 210 and the status signal may be a hydraulic pressure value measured by the sensors.

Some of the plurality of first valves 212 may be first block valves WSV, LPSV, and MCV, LSV, and LPMCV configured to control flow of fluid from the wheel brakes w1 to w4 to the fluid reservoir 240. The first block valves WSV, LPSV, and MCV, LSV, and LPMCV are not necessarily mounted for the purpose of blocking flow of fluid from the wheel brakes w1 to w4 to the fluid reservoir 240. The first block valves WSV, LPSV, and MCV, LSV, and LPMCV, for example, may be valves that are mounted so that the motor piston 111*b* can supply hydraulic pressure to the wheel brakes w1 to w4 and that are configured to serve to block decompression of the wheel brakes w1 to w4.

Referring to FIG. 3, in the hydraulic brake for a vehicle of the first control method 100, the first block valves WSV, LPSV, and MCV, LSV, and LPMCV may be combinations of valves LPWSV and WSV connected in series between the master cylinder 111*a* and the wheel brakes w1 to w4 and valves MCV, LSV, and LPMCV connected in series between the motor piston 111*b* and the wheel brakes w1 to w4. The first valve 212 may be configured such that not only whether the first valve 212 is opened, but the degree of opening are controlled. The first block valves WSV, LPSV, and MCV, LSV, and LPMCV may be normal open type solenoid valves of which the channels therein are open when a current is not applied.

The second brake device 220 is configured to supply second hydraulic pressure to at least some of the wheel brakes w1 to w4. The second brake device 220 may include a second pressurizing device 221 that pressurizes fluid, and a plurality of second valves 222 configured to adjust a flow path of fluid. The second pressurizing device 221 is configured to pressurize fluid. The second pressurizing device 221, for example, may be a motor pump. Some of the second valves 222 may be second block valves TCV1 and TCV2 configured to control flow of fluid from the wheel brakes w1 to w4 to the fluid reservoir 240. The second block valves TCV1 and TCV2 are not necessarily mounted for the purpose of blocking flow of fluid from the wheel brakes w1 to w4 to the fluid reservoir 240. The second block valves TCV1 and TCV2, for example, may be valves that are mounted so that the motor piston can supply hydraulic pressure to the wheel brakes w1 to w4 and that are configured to serve to block decompression of the wheel brakes w1 to w4. Referring to FIG. 3, the second block valves TCV1 and TCV2 may be connected in series between the first brake device 210 and the wheel brakes w1 to w4. The first valve 212 may be configured such that not only whether the first valve 212 is opened, but the degree of opening are controlled. The control unit 290 includes first and second controller 291 and 292. The first controller 291 controls the first brake device 210 and the second controller 292 controls the second brake device 220.

Figure 4:
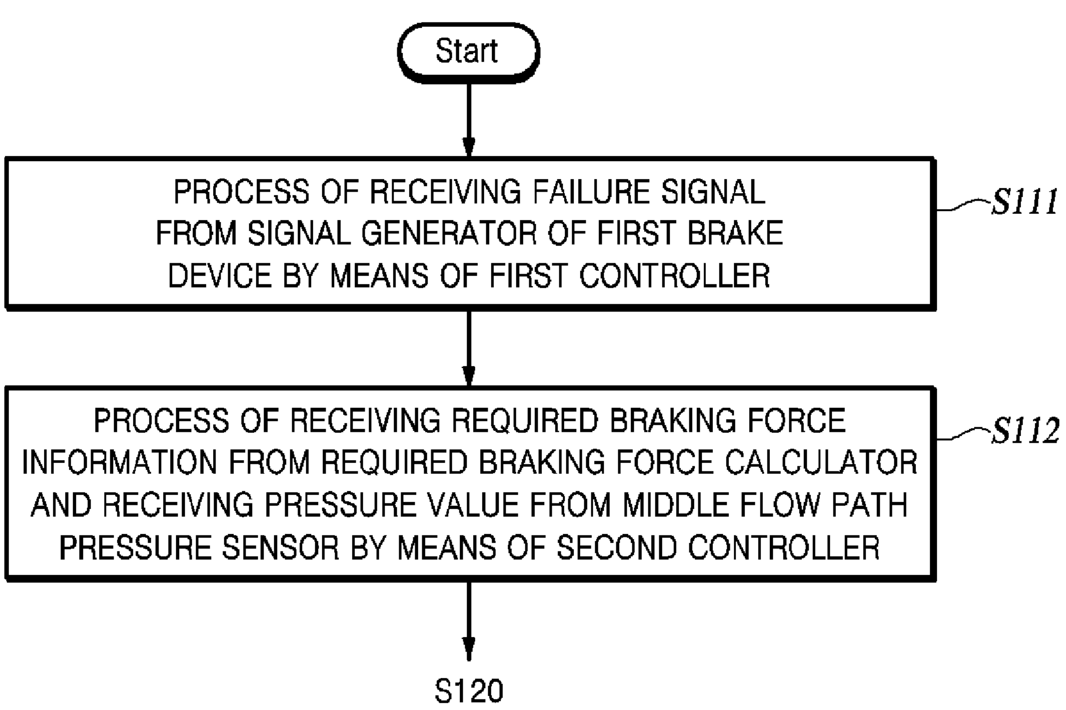
FIG. 4 is a flowchart showing an information collection process according to an embodiment of the present disclosure.

FIG. 4 is a flowchart showing an information collection process according to an embodiment of the present disclosure.

The control unit 290 receives information for determining the status of the first brake device 210. In the process S110, the first controller 291 can receive a component status signal of the first brake device 210 from the signal generator 215 of the first brake device 210.

In the process S110, the control unit 290 can receive required braking force information from the required braking force calculator 250 and can receive hydraulic pressure information, which is supplied to the wheel brakes w1 to w4 from the first brake device 210, from the second brake device 220. The required braking force calculator 250 is configured to calculate required braking force on the basis of a deceleration signal generated by an autonomous driving system for a vehicle (not shown) or a pedal effort by a driver. In the present disclosure, the hydraulic pressure supplied to the wheel brakes w1 to w4 by the first brake device 210 is referred to as first hydraulic pressure and the hydraulic pressure supplied to the wheel brakes w1 to w4 by the second brake device 220 is referred to as second hydraulic pressure. When the second brake device 220 does not generate hydraulic pressure, it is possible to measure the first hydraulic pressure using wheel-side hydraulic pressure sensors mounted on the wheel brakes w1 to w4. When the second brake device 220 is connected in series between the first brake device 210 and the wheel brakes w1 to w4, a middle flow path pressure sensor MPS mounted in the channel of the second brake device 220 at the first brake device 210 can measure the first hydraulic pressure. By using the middle flow path pressure sensor MPS, there is an advantage in that the middle flow path pressure sensor MPS can measure the first hydraulic pressure when the channel connecting the second pressurizing device 221 and the middle flow path pressure sensor MPS is closed even though the second pressurizing device 221 generates second hydraulic pressure.

In the process S110, the second controller 292 can receive required braking force information from the required braking force calculator 250 and the second controller 292 can receive first hydraulic pressure information from the second brake device 220 (S112). In the process S110 to the process S130, a process in which the first controller 291 and the second controller 292 exchange information for determining the status of the first brake device 210 may be performed. For example, the first controller 292 may transmit a status signal received from the first brake device 210 to the second controller 292. According to the process S112, since the second controller 292 can receive required braking force information even not via the first controller 291, so the communication time decreases, and accordingly, the control unit 290 can easily respond to a situation in which the first brake device 210 is abnormally operated.

Although it is shown in FIG. 4 that the process S112 is performed after the process S111, the present disclosure is not limited thereto. The control method 100 according to an embodiment of the present disclosure includes a control method 100 that simultaneously performs the process S111 and the process S112 or performs only one of the process S111 and the process S112. For example, since the signal generator 215 of the first brake device 210 is also a component included in the first brake device 210, when the first brake device 210 is entirely abnormally operated due to a case which power is not supplied to the first brake device 210, or the like, the process S111 cannot be performed. In this case, the second controller 292 can determine whether the first brake device 210 is normally operated using the required braking force and the first hydraulic pressure (S112).

Figure 5:
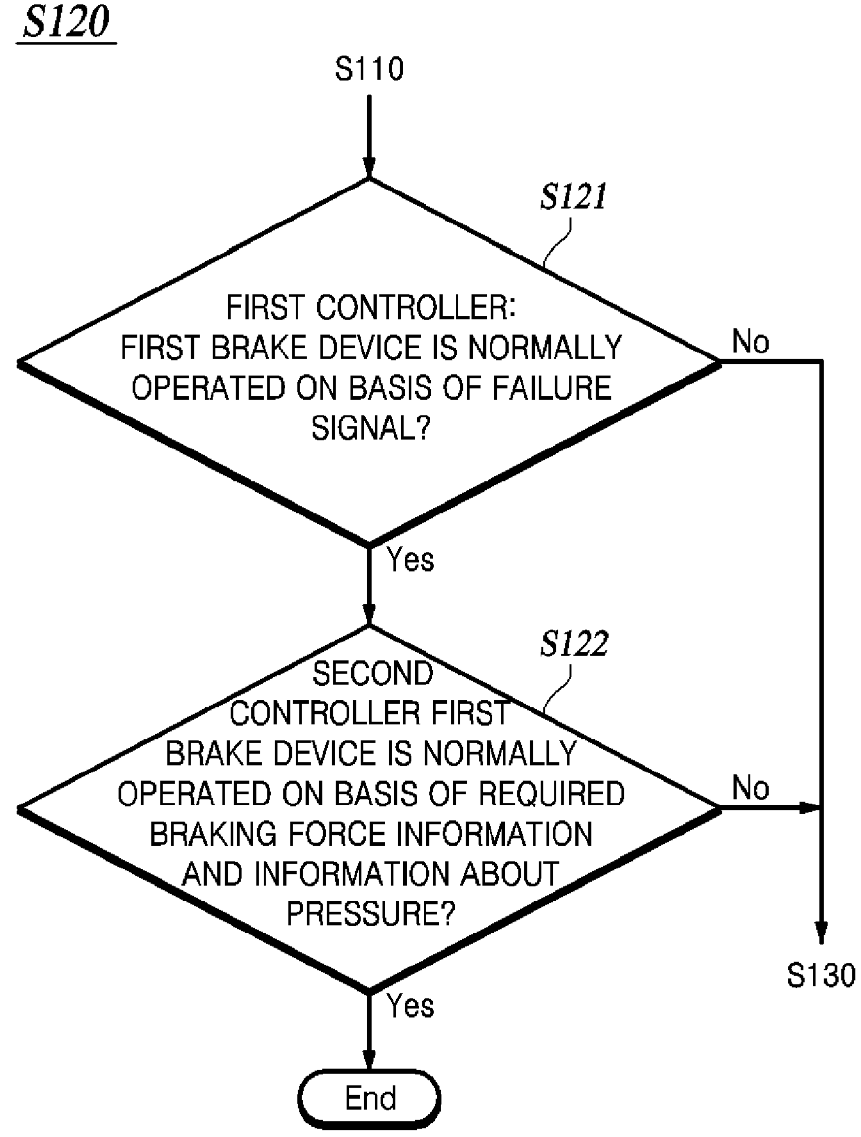
FIG. 5 is a flowchart showing a status determination process of a first brake device according to an embodiment of the present disclosure.

FIG. 5 is a flowchart showing a status determination process of the first brake device 210 according to an embodiment of the present disclosure.

Referring to FIG. 5, the control unit 290 determines whether the first brake device 210 is normally operated using received information (S120). In the process S120, the first controller 291 can determine whether the first brake device 210 is normally operated using information for determining the status of the first brake device 210. The information for determining the status of the first brake device 210 may be a status signal transmitted from the signal generator 215 (S121).

The control unit 290 can determine whether the first brake device 210 is normally operated on the basis of required braking force information and information about pressure. When the required braking force is larger than the hydraulic pressure of the wheel brakes w1 to w4 and the hydraulic pressure measured by the middle flow path pressure sensor MPS was not increased for a predetermined time, the control unit 290 can determine that the first brake device 210 is not normally operated. The predetermined time, which is time that the wheel brakes w1 to w4 take to generate the required braking force after the time point at which the first controller 291 receives a required braking signal, may be a value that is obtained by the transmission/reception speed of a signal, channel resistance, etc. The predetermined time may be experimentally obtained and stored in the form of a look up table (LUT) in a memory. The second controller 292 can determine whether the first brake device 210 is normally operated on the basis of required braking force information and information about pressure (S122). The process S122 may be performed even through the first controller 291 is not normally operated.

In the process of S120, when it is determined that the first brake device 210 is not normally operated, the control unit 290 controls the first brake device 210 and/or the second brake device 220 to decrease a hydraulic pressure loss amount in the wheel brakes w1 to w4 (S130 to S190). The first controller 291 can control the open or closed status of the first valves. The first controller 291 can control the open or closed status of the first block valves (WSV, LPSV, and MCV, LSV and LPMCV). Referring to FIG. 3, when the second brake device 220 is connected in series between the first control device and at least one of the wheel brakes w1 to w4, the second controller 292 can control the second brake device 220 to decrease the amount of fluid that is transmitted to a low-pressure fluid reservoir from the second brake device 220. The second controller 292 controls the open or closed status of the second block valves TCV1 and TCV2, so it is possible to suppress a loss of hydraulic pressure of the wheel brakes w1 to w4. Controlling the open/close status means that the first controller 291 adjusts a current that is supplied to the first block valves WSV, LPSV, and MCV, LSV, and LPMCV. The first block valves WSV, LPSV, and MCV, LSV, and LPMCV and the second block valves TCV1 and TCV2 may be configured such that the open or closed status thereof changes in accordance with the magnitude of a current that is supplied thereto.

The control unit 290 according to an embodiment of the present disclosure can determine whether all of the components of the first brake device 210 are abnormally operated. Referring to FIG. 1, the first controller 291 can determine whether all of the components of the first brake device 210 are abnormally operated. The components of the first brake device 210 may be the first pressurizing device 211 and the first valves 212. A status signal may include failure information of each of the components of the first brake device 210. The first controller 291 can perform the process S130 on the basis of the status signal.

When all of the components of the first controller 292 are abnormally operated in the process S130, the second controller 292 controls the second brake device 220 to decrease a hydraulic pressure loss amount in the wheel brakes w1 to w4 (S150). Referring to FIG. 3, when the second brake device 220 is connected in series between the first brake device 210 and at least one of the wheel brakes w1 to w4, the second controller 292 can control the open or closed status of the second block valves TCV1 and TCV2 that control flow of fluid to the first brake device 210. Hereafter, controlling the open or closed status of a valve means that whether the valve is opened or closed or the degree of opening thereof is controlled. When the second block valves TCV1 and TCV2 are closed, fluid is not transmitted to the low-pressure fluid reservoir 240 from the wheel brakes w1 to w4 to which the second brake device 220 is connected. It is possible to prevent a loss of the braking pressure of the wheel brakes w1 to w4 to which the second brake device 220 is connected. The process S150 is a process in which the second controller 292 controls the second brake device 220, so the process S150 may be performed when all of the components of the first brake device 210 are abnormally operated. Thereafter, the second controller 292 can determine whether the back-up control of the second controller 292 is needed (S170). When back-up control is not needed, the second controller 292 determines whether the required braking force was increased (S182). When the required braking force was not increased in S182, the second controller 292 stops the control of S150 (S183), and when the required braking force was increased, the second controller 292 keeps performing the control of S150 (S184).

Figure 6:
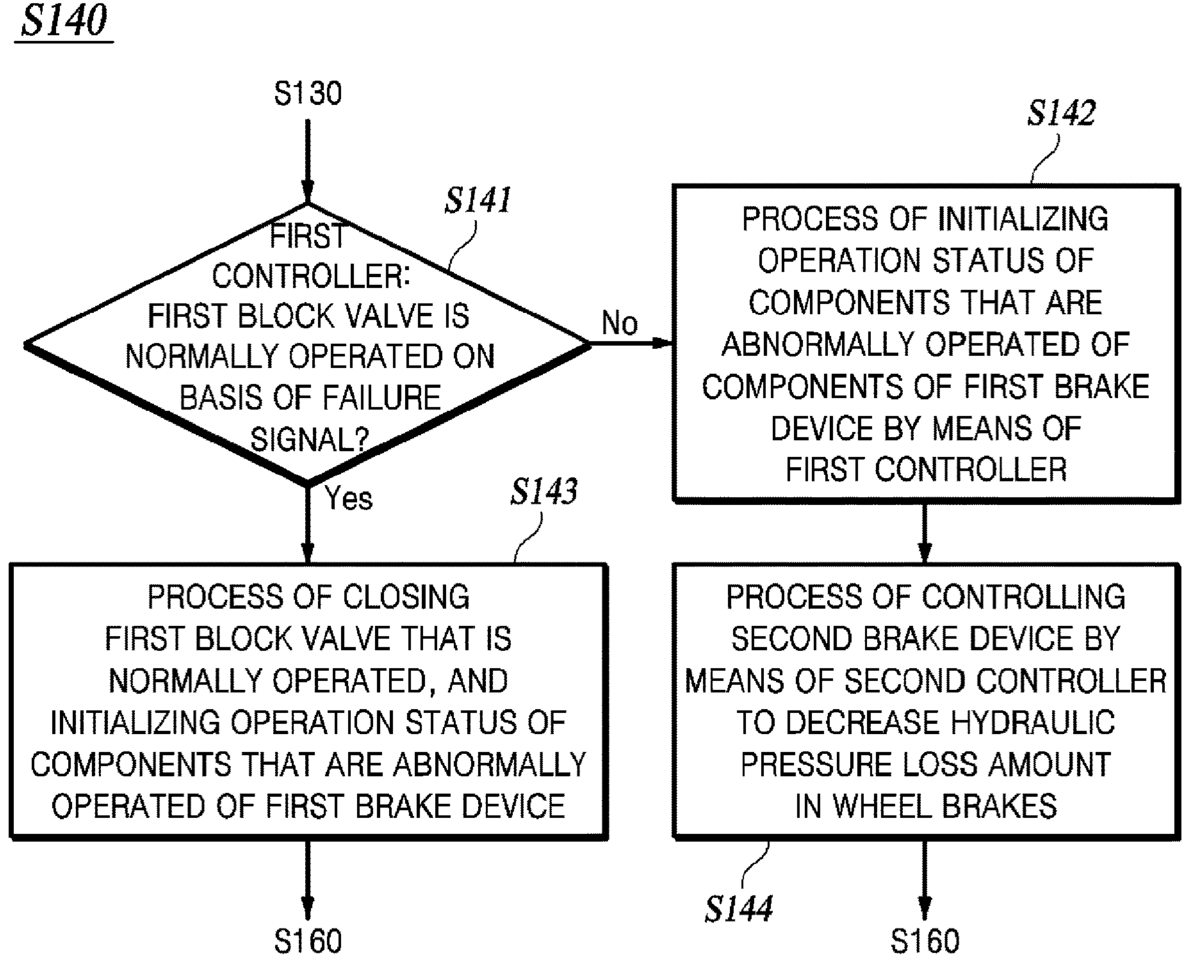
FIG. 6 is a flowchart showing a process in which a control unit of the present disclosure controls a first brake device or a second brake device.

FIG. 6 is a flowchart showing a process in which a control unit of the present disclosure controls a first brake device or a second brake device.

Referring to FIG. 6, in the process of S130, when it is determined that some components of the first brake device 210 are normally operated, the control unit 290 controls the first brake device 210 and/or the second brake device 220 to decrease a hydraulic pressure loss amount in the wheel brakes w1 to w4 (S140).

In the process S140 according to an embodiment of the present disclosure, the first controller 291 can determine whether the first block valves WSV, LPSV, and MCV, LSV, and LPMCV are normally operated (S141). When it is determined that at least some of the first block valves WSV, LPSV, and MCV, LSV, and LPMCV are normally operated, the first block valves WSV, LPSV, and MCV, LSV, and LPMCV that are normally operated are closed, and the first controller 291 initializes the operation status of the components of the first brake device 210 that are abnormally operated. When the first block valves WSV, LPSV, and MCV, LSV, and LPMCV are closed, fluid is not transmitted from the wheel brakes w1 to w4 to the fluid reservoir 240. Accordingly, it is possible to suppress a loss of hydraulic pressure of the wheel brakes w1 to w4.

When it is determined that all of the first block valves WSV, LPSV, and MCV, LSV, and LPMCV are abnormally operated in the process S141, the first controller 291 initializes the operation status of the components, which are abnormally operated, of the components of the first brake device 210. For example, the first controller 291 can temporarily stop a current from being supplied to some of the first valves 212 that are abnormally operated. Further, the second controller 292 can control the second brake device 220 to decrease a hydraulic pressure loss amount in the wheel brakes w1 to w4 (S144). Referring to FIG. 3, when the second brake device 220 is connected in series between the first brake device 210 and at least one of the wheel brakes w1 to w4, the second controller 292 can control the open or closed status of the second block valves TCV1 and TCV2 that control flow of fluid to the first brake device 210 in the process S144. In detail, the second controller 292 can control the second block valves TCV1 and TCV2 to be closed.

In the process S140, cooperative control in which the first controller 291 controls some components of the first brake device 210 that are normally operated and the second controller 292 controls the second brake device 220. In a common redundancy brake system, an auxiliary controller suppresses a loss of hydraulic pressure of the wheel brakes w1 to w4 by controlling an auxiliary brake device. In order for the auxiliary controller to control the auxiliary brake device, the auxiliary controller should undergo a process of receiving a status signal from a main controller. On the contrary, the control method 100 according to an embodiment of the present disclosure receives a status signal (S111) and suppresses a loss of hydraulic pressure of the wheel brakes w1 to w4 and controlling the first brake device 210. Accordingly, it is possible to quickly suppress a loss of hydraulic pressure of the wheel brakes w1 to w4 without undergoing the process in which an auxiliary controller receives a status signal from a main controller.

After a preset period is exceeded from the process 5140, the control unit 290 determines whether the first brake device 210 is abnormally operated (S160). If it is determined that it is not so, the control unit 290 keeps performing the control of the process s140 (S181). For example, the first controller 291 maintains the closed status of the first block valves WSV, LPSV, and MCV, LSV, and LPMCV that are normally operated. Unlikely, when it is determined that the first brake device 210 is being abnormally operated after a preset period is exceeded, the second controller 292 performs back-up control (S190). Even though it is determined that back-up control is needed in the process S170, the second controller 292 may perform back-up control (S190). That is, the second controller 292 controls the second pressurizing device 221 of the second brake device 220 and controls the open or closed status of the second valves 222 on the basis of a required braking force, the hydraulic pressure information of the wheel brakes w1 to w4, etc.

According to the control method 100 according to an embodiment of the present disclosure, by determining whether the status of the first brake device is a transition phase and correspondingly controlling the first and second brake devices 210 and 220, it is possible to prevent a loss of pressure of the wheel brakes w1 to w4 due to a communication time between the first and second controllers 291 and 292, channel resistance, etc. The control method 100 according to an embodiment of the present disclosure may be performed using a hydraulic brake for a vehicle of the control method 100 according to an embodiment.

Figure 7:
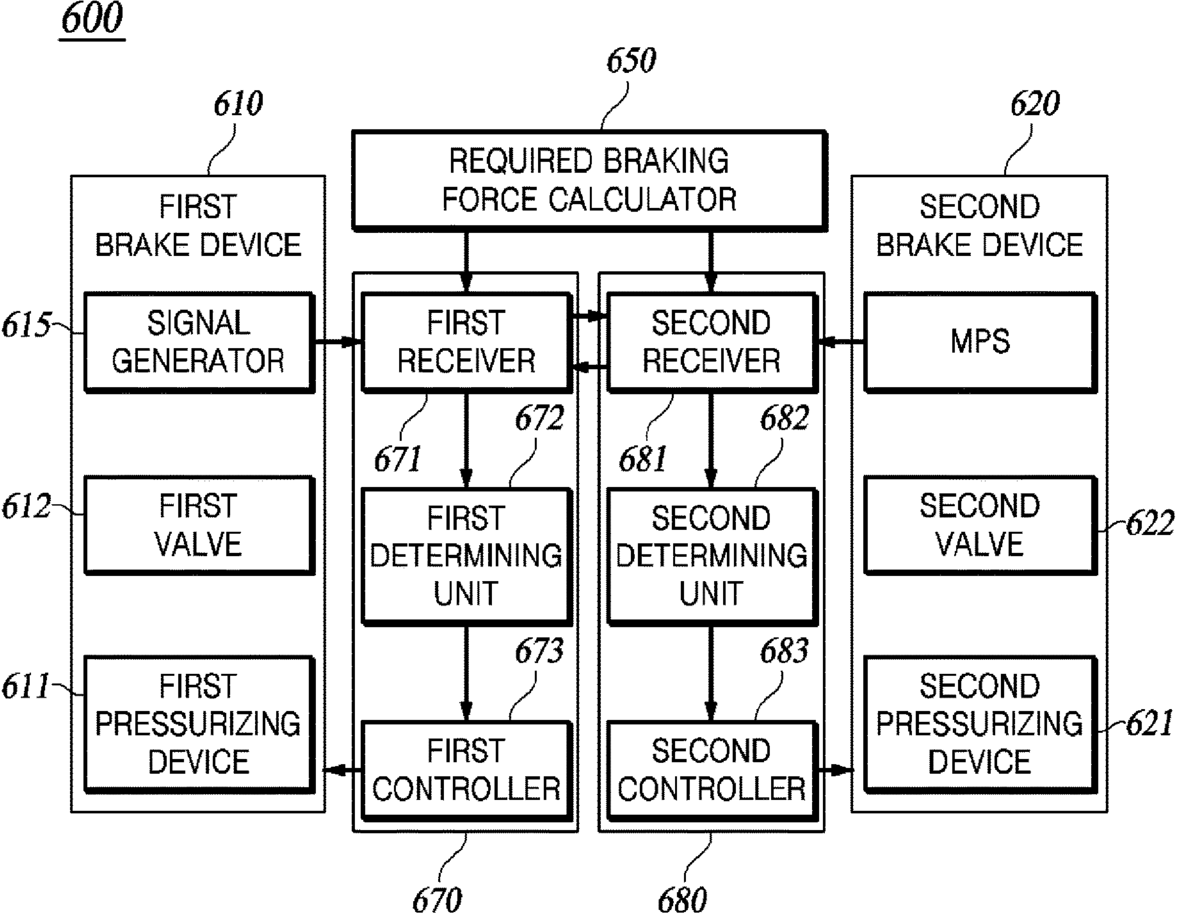
FIG. 7 is a block diagram showing the configuration of a hydraulic brake for a vehicle and a control method therefor according to an embodiment of the present disclosure.

FIG. 7 is a block diagram showing the configuration of a hydraulic brake for a vehicle according to an embodiment of the present disclosure.

Figure 8:
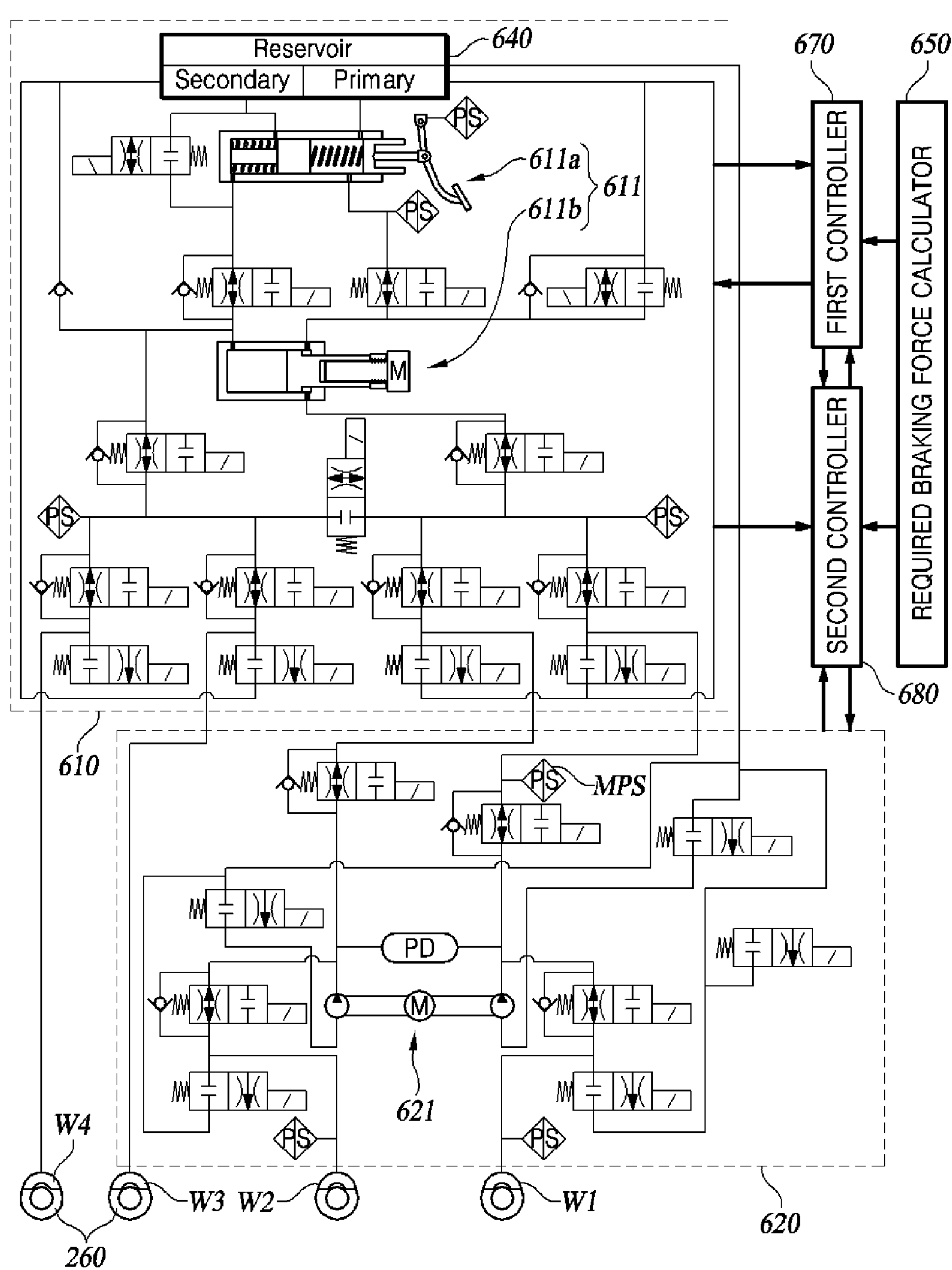
FIG. 8 is a hydraulic circuit diagram showing a hydraulic brake for a vehicle and a control device therefor according to an embodiment of the present disclosure.

FIG. 8 is a hydraulic circuit diagram showing a hydraulic brake apparatus for a vehicle according to an embodiment of the present disclosure.

Referring to FIGS. 7 and 8, a hydraulic brake 600 for a vehicle according to an embodiment of the present disclosure includes all or some of a first brake device 610, a second brake device 620, a required braking force calculator 650, a first control unit 670, a second control unit 680, and an electronic parking brake 660.

The first control unit 670 controls the first brake device 610 configured to supply first hydraulic pressure a plurality of wheel brakes w1 to w4. The first brake device 610 may include all or some of a signal generator 615, a first pressurizing device 611, and a first valve 612 configured to selectively transmit hydraulic pressure generated by a pressurizing device to the plurality of wheel brakes w1 to w4. The signal generator 615 includes sensors that sense hydraulic pressure, temperature, current, or the like in the channel of the first brake device 610 and the status signal may be a hydraulic pressure value measured by the sensors. The first control unit 670 may include all or some of a first receiver 671, a first determining unit 672, and a first controller 673. The first receiver 671 receives a status signal of the components of the first brake device 610 from the signal generator 615 of the first brake device 610. The first determining unit 672 determines whether the first brake device 610 is normally operated. The first determining unit 672 can determine whether the first brake device 610 is normally operated on the basis of a status signal. When the first brake device 610 is not normally operated, the first controller 673 controls the first brake device 610 to block flow of fluid from the wheel brakes w1 to w4 to the fluid reservoir 640. For example, the first controller 673 can close first block valves WSV, LPSV, and MCV, LSV, and LPMCV connected in series between the wheel brakes w1 to w4 and the fluid reservoir 640 when the first brake device 610 is not normally operated.

The second control unit 680 controls the second brake device 620 configured to supply second hydraulic pressure to at least one of the wheel brakes w1 to w4. The second brake device 620 is connected in series between at least some of the wheel brakes w1 to w4 and the first brake device 610. The second brake device 620 may include all or some of a middle flow path pressure sensor MPS, a second pressurizing device 621, and a second valve 622 configured to selectively transmit hydraulic pressure generated by a pressurizing device to the plurality of wheel brakes w1 to w4. Referring to FIG. 8, the middle flow path pressure sensor MPS is mounted in a channel at the first brake device 610. In the present disclosure, the hydraulic pressure supplied to the wheel brakes w1 to w4 by the first brake device 610 is referred to as first hydraulic pressure and the hydraulic pressure supplied to the wheel brakes w1 to w4 by the second brake device 620 is referred to as second hydraulic pressure. When the second brake device does not generate hydraulic pressure, it is possible to measure the first hydraulic pressure using wheel-side hydraulic pressure sensors mounted on the wheel brakes w1 to w4.

The second control unit 680 may include all or some of a second receiver 681, a second determining unit 682, and a second controller 683. The second receiver 681 receives required braking force information from the required braking force calculator 650 for a vehicle and receives information about pressure from the middle flow path pressure sensor MPS. The second receiver 681 can receive information about whether the first brake device 610 is normally operated which was determined by the first determining unit 672. The second determining unit 682 determines whether the first brake device 610 is normally operated. When the required braking force is larger than the hydraulic pressure of the wheel brakes w1 to w4 and the hydraulic pressure measured by the middle flow path pressure sensor MPS was not increased for a predetermined time, the second control unit 682 can determine that the first brake device 610 is not normally operated. When the first control unit 670 is not normally operated, the second controller 683 controls the second brake device 620 to block flow of fluid from the wheel brakes w1 to w4 to the fluid reservoir 640. For example, when the first brake device 610 is not normally operated, the second controller 683 can close second block valves TCV1 and TCV2 connected in series between the first brake device 610 and the wheel brakes w1 to w4.

According to the hydraulic brake for a vehicle 600 according to an embodiment of the present disclosure, by determining whether it is a transition phase and correspondingly controlling the first and second brake devices 610 and 620, it is possible to prevent a loss of pressure of the wheel brakes w1 to w4 due to a communication time between the first and second controllers 673 and 683, channel resistance, etc. Further, even if not only the first brake device 610, but the first controller 673 is not normally operated, the second controller 683 can prevent a loss of hydraulic pressure of the wheel brakes w1 to w4 through the reception, determination, and control processes. Further, since the first controller 673 controls some components of the first brake device 610 that can be normally operated, it is possible to prevent a loss of hydraulic pressure of the wheel brakes w1 to w4 in the transition phase using only the first brake device 610. When only the first brake device 610 is used, it is not required to undergo the process in which the first controller 673 and the second controller 683 transmit and receive signals, so the hydraulic brake for a vehicle 600 according to an embodiment of the present disclosure can quickly cope with a loss of hydraulic pressure due to failure of the first brake device 610.

A pair of electronic parking brakes 660 may be mounted on each of the left rear wheel and the right rear wheel of a vehicle. The electronic parking brakes 660 brake the corresponding wheels using a motor. The second brake device 620 is connected in series between wheel brakes w1 to w4 mounted on the front wheel of a vehicle of the wheel brakes and the first brake device 610. The second brake device 620 can provide braking pressure to the front wheels of a vehicle by assisting the first brake device 610 and the electronic parking brake 660 can provide braking pressure to the rear wheel of the vehicle by assisting the first brake device 610.

According to an embodiment, there is an effect in that the control method of a hydraulic brake for a vehicle and the hydraulic brake stably generate a braking force required for the vehicle by controlling a main brake device or an assistant brake device to prevent a loss of hydraulic pressure of a wheel brake during a transition phase I which a normal control steps enters a cooperative brake step.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method of controlling a hydraulic brake for a vehicle including a first brake device and a second brake device configured to supply hydraulic pressure to wheel brakes of the vehicle, and a control unit including a first controller configured for controlling the first brake device and a second controller configured for controlling the second brake device, the method comprising:

receiving, by the control unit, information for determining a status of the first brake device;

determining, by the control unit, whether the first brake device is normally operated using the information for determining the status of the first brake device; and controlling, by the control unit, at least one of the first brake device and the second brake device to decrease a hydraulic pressure loss amount in the wheel brakes when the control unit concludes that the first brake device is not normally operated, wherein the receiving of the information for determining the status of the first brake device includes:

receiving from the second brake device, by the control unit, information about hydraulic pressure supplied to the wheel brakes by the first brake device, wherein the method further comprises:

determining, by the first controller, whether all of components of the first brake device are abnormally operated when the control unit concludes that the first brake device is not normally operated, wherein when the first controller concludes that all of the components of the first brake device are abnormally operated, the controlling of the at least one of the first brake device and the second brake device includes controlling the second brake device by the second controller to decrease the hydraulic pressure loss amount of the wheel brakes.

2. The method of claim 1, wherein the receiving of the information for determining the status of the first brake device includes receiving a status signal of components of the first brake device from a signal generator of the first brake device by first brake device.

3. The method of claim 2, wherein the receiving of the status signal of components includes receiving the status signal of the components of the first brake device by the control unit.

4. The method of claim 1, wherein the determining, by the control unit, of whether the first brake device is normally operated includes determining whether the first brake device is normally operated using the information for determining the status of the first brake device by the first controller.

5. The method of claim 1, wherein the receiving of the information for determining the status of the first brake device further includes:

receiving, by the control unit, required braking force information from a required braking force calculator.

6. The method of claim 5, wherein the receiving of the information about the hydraulic pressure supplied to the wheel brakes by the first brake device includes receiving, by the control unit, a pressure measurement value from a middle flow path pressure sensor mounted in a channel of the second brake device, the channel connected to the first brake device.

7. The method of claim 6, wherein the determining of whether the first brake device is normally operated includes determining that the first brake device is not normally operated when the required braking force is larger than the hydraulic pressure of the wheel brakes and the pressure measurement value measured by the middle flow path pressure sensor was not increased for a predetermined period.

8. The method of claim 1, wherein the receiving of the information for determining the status of the first brake device includes transmitting and receiving the information for determining the status of the first brake device by the first controller and the second controller.

9. The method of claim 5, wherein the receiving, by the control unit, of the required braking force information from the required braking force calculator includes receiving, by the second controller, the required braking force information from the required braking force calculator, and wherein the receiving, by the control unit, of the information about the hydraulic pressure supplied to the wheel brakes by the first brake device from the second brake device includes receiving, by the second controller, of information about the hydraulic pressure supplied to the wheel brakes by the first brake device from the second brake device.

10. The method of claim 1, wherein the controlling of the at least one of the first brake device and the second brake device includes controlling the second brake device by the second controller to decrease an amount of fluid that is transmitted to a fluid reservoir from the second brake device connected in series between the first brake device and at least one of the wheel brakes.

11. The method of claim 10, wherein the controlling of the second brake device includes controlling, by the second controller, an open or closed status of a second block valve, which controls flow of fluid from the second brake device to the first brake device.

12. The method of claim 1, wherein the controlling of the at least one of the first brake device and the second brake device includes controlling, by the control unit, an open or closed status of a plurality of valves mounted on the first brake device.

13. The method of claim 12, wherein the controlling of the open or closed status of the plurality of valves mounted on the first brake device includes controlling, by the first controller, an open or closed status of a first block valve, which controls flow of fluid from a fluid reservoir from the wheel brakes.

14. The method of claim 1, wherein when the control unit concludes that at least one of the components of the first brake device is normally operated, the controlling of the at least one of the first brake device and the second brake device includes controlling, by the first controller, the component that is normally operated of the first brake device to decrease the hydraulic pressure loss amount of the wheel brakes.

15. A hydraulic brake apparatus for a vehicle, the hydraulic brake apparatus comprising:

a first control unit configured for controlling a first brake device configured to supply a first hydraulic pressure to a plurality of wheel brakes for the vehicle; and a second control unit configured for controlling a second brake device connected in series between at least one of the plurality of wheel brakes and the first brake device, wherein the first control unit includes:

a first receiver configured for receiving a status signal of components of the first brake device from a signal generator of the first brake device;

a first determining unit configured for determining whether the first brake device is normally operated; and a first controller electrically connected to the first brake device and configured for controlling the first brake device to block flow of fluid to a fluid reservoir from the wheel brakes when the first brake device is not normally operated, and wherein the second control unit includes:

a second receiver configured for receiving required braking force information from a required braking force calculator of the vehicle and receiving information about pressure from a middle flow path pressure sensor mounted in a channel at the first brake device;

a second determining unit configured for determining whether the first brake device is normally operated; and a second controller electrically connected to the second brake device and configured for controlling the second brake device to block flow of fluid from the fluid reservoir from the wheel brakes when the first brake device is not normally operated.

16. The hydraulic brake apparatus of claim 15, wherein the second receiver receives information about whether the first brake device is normally operated which is determined by the first determining unit.

17. The hydraulic brake apparatus of claim 15, wherein when the first brake device is not normally operated, the first controller is configured to control a first block valve, which is connected in parallel between the wheel brakes and the fluid reservoir, to be closed.

18. The hydraulic brake apparatus of claim 15, wherein when the first brake device is not normally operated, the second controller is configured to control a second block valve, which is connected in parallel between the wheel brakes and the first brake device, to be closed.

19. The hydraulic brake apparatus of claim 15, further including:

a pair of electronic parking brakes mounted on a left rear wheel and a right rear wheel of the vehicle and configured for braking corresponding wheels using a motor, wherein the second brake device is connected in series between the wheel brakes mounted on front wheels of the vehicle of the wheel brakes and the first brake device.

* * * * *